United States Patent
Barkan

(10) Patent No.: US 7,120,315 B2
(45) Date of Patent: Oct. 10, 2006

(54) METHOD AND APPARATUS FOR CAPTURING IMAGES USING BLEMISHED SENSORS

(75) Inventor: Stanley Barkan, Hof HaCarmel (IL)

(73) Assignee: CREO IL., Ltd, Herzlia (IL)

(*) Notice: Subject to any disclaimer, the term of this patent is extended or adjusted under 35 U.S.C. 154(b) by 833 days.

(21) Appl. No.: 10/269,038

(22) Filed: Oct. 11, 2002

(65) Prior Publication Data
US 2003/0174902 A1    Sep. 18, 2003

(51) Int. Cl.
*G06K 9/32* (2006.01)

(52) U.S. Cl. .................. 382/294; 382/284; 358/3.26

(58) Field of Classification Search ............... 382/294, 382/299, 284, 276, 312, 254, 167; 358/3.24, 358/3.26, 1.12, 504, 505, 518, 525; 702/94, 702/95; 348/187, 189, 230.1, 246, 247
See application file for complete search history.

(56) References Cited

U.S. PATENT DOCUMENTS

| | | | |
|---|---|---|---|
| 4,581,649 A | 4/1986 | Morokawa | |
| 4,748,507 A | 5/1988 | Gural | |
| 4,805,023 A | 2/1989 | Younse et al. | |
| 5,144,446 A | 9/1992 | Sudo et al. | |
| 5,159,457 A | 10/1992 | Kawabata | |
| 5,363,213 A | 11/1994 | Coward et al. | |
| 6,507,638 B1* | 1/2003 | Curtis et al. | 378/98.3 |
| 2002/0114536 A1* | 8/2002 | Xiong et al. | 382/284 |
| 2004/0207738 A1* | 10/2004 | Wacker | 348/294 |

FOREIGN PATENT DOCUMENTS

| | | |
|---|---|---|
| EP | 0762741 | 3/1997 |
| EP | 1067778 | 1/2001 |
| EP | 1329095 | 7/2003 |
| EP | 1347635 | 9/2003 |
| JP | 3296375 A2 | 12/1991 |
| JP | 04-356450 | 7/1994 |
| JP | 06189318 | 7/1994 |
| WO | WO 01/52525 | 7/2001 |

OTHER PUBLICATIONS

Bushaw et al. "Bad Pel Detection and Correction", IBM Technical Disclosure Bulletin, 24(11B): 5898-5899, Apr. 1982.
Brown "A Survey of Image Registration Techniques", ACM Computing Surveys, 24(4): 325-376, 1992.

* cited by examiner

*Primary Examiner*—Yon J. Couso

(57) ABSTRACT

Apparatus for image capture via a blemished sensor, comprising: a large area pixel based image sensor being actuatable to move between a first image capture position and a second image capture position, an image capture controller for controlling said sensor to move between said image capture positions during an image capture operation thereby to take a sub-image at each one of said positions so that each part of an image subject is captured by at least two separate pixels of said sensor, and an integrator, associated with said sensor, for integrating said sub-images into a single full image. Preferably, the sensor is tested to find blemish positions and a shift is calculated that minimizes the number of blemish positions that superimpose between the two pixel positions.

18 Claims, 4 Drawing Sheets

METHOD AND APPARATUS FOR CAPTURING IMAGES USING BLEMISHED SENSORS

FIELD OF THE INVENTION

The present invention relates to a method and apparatus for capturing images using blemished sensors.

BACKGROUND OF THE INVENTION

Digital cameras and other image capture devices have pixel based sensors. In the case of a digital camera the sensor is part of the digital camera back, hereinafter referred to simply as the back. The sensor comes in two types, those that substantially cover the full image capture so that only a single image capture operation is needed per image, and those in which the image size is a fraction of the full image capture area, so that the sensor needs to be shifted for separate captures over the capture area. The former are referred to herein as large area sensors. In state-of-the-art digital cameras or cameras with digital camera backs having large area sensors, the most costly component is usually the image sensor. This is primarily because fabrication yield, that is the proportion of sensors manufactured that are passed for use, is approximately proportional to the area. Typically, for sensors larger than 16 mm×24 mm, less than half of the sensors manufactured are passed as suitable for imaging. Sensors that are considered as not being suitable for imaging are generally rejected because they have blemishes that cannot be corrected using conventional means. Blemishes are regions of one or more unreliable pixels. In general single pixel, or close to single pixel, blemishes can be compensated for using conventional means. However, certain larger types of blemish such as clusters of more than 2×2 unreliable pixels, or adjacent multi-row or multi-column blemishes cannot be compensated for using conventional means and sensors having such blemishes are typically rejected.

An example of conventional blemish compensation is disclosed in JP3296375A2, which discloses a blemish correcting circuit for implementing blemish correction processing by subtracting a signal at a level indicating blemish level data from an output signal of a pixel. U.S. Pat. No. 5,159,457 assigned to Sony Corporation, discloses an adjustment operational mode, in which a charge coupled device (CCD) having pixels with a temperature dependent blemish is driven so that the CCD accumulates N times as much charge as in an ordinary operational mode. A corresponding offset voltage is supplied to a temperature sensor so that a blemish compensation signal from a blemish compensation signal generator can be adjusted with high accuracy. In the adjustment mode, the temperature of the CCD is raised, so that the level of the blemish component of the signal output from the CCD is large enough to be accurately adjusted. In an ordinary operational mode, the compensation signal from the blemish compensation signal generator which has been level-adjusted with high accuracy in the adjustment operational mode is added to an image pick-up output signal of the CCD to produce a blemish compensated signal adjusted with high accuracy. The above system is not suitable for most types of manufacturing blemish however.

Certain backs are designed to capture a full image in 3 separate image capture operations or shots. An example is the Leaf Volare camera back which implements color image capture by taking each shot through a different colored filter. Another example of multiple shot image capture is that of the Leaf Cantare XY camera back and similar devices, which use a color filter array sensor. The back is designed to capture the image in two or three shots wherein the sensor is moved by an exact pixel shift between the shots in order to obtain full color sampling. Such camera backs generally use a small size sensor, which does not cover the full imaging area, since the smaller sensor gives a higher fabrication yield and it thus cheaper to produce. Large area sensor, which cover the imaging area are prohibitively costly.

It would be advantageous to provide a camera back with a sensor whose area size is closer to the optical imaging area size, at a reduced cost.

SUMMARY OF THE INVENTION

According to a first aspect of the present invention there is thus provided apparatus for image capture via a blemished sensor, comprising:

an image sensor, said image sensor comprising pixels and being actuatable to move between at least a first image capture position and a second image capture position, an image capture controller for controlling said sensor to move between said image capture positions during an image capture operation thereby to take a sub-image at each one of said positions so that parts of an image subject are captured by at least two separate pixels of said sensor, and an integrator, associated with said sensor, for integrating said sub-images into a single full image.

Preferably, said sensor is actuatable about two separate axes.

Preferably, said sensor is substantially quadrilateral and said two separate axes are respective diagonals of said sensor.

The apparatus may further comprise a calibrator operable to calibrate said apparatus by determining said image detection positions such that a minimum of blemished pixels are superimposed over other blemished pixels for all of said image capture positions.

Preferably, said calibrator is operable to carry out a blemish test on said sensor to determine positions of blemished pixels.

Preferably, said blemish test comprises analysis of a test image of a uniformly illuminated area, captured by said sensor.

The apparatus may further comprise a registration device for registering a position of said sensor.

The registration device may further comprise two projection units for projecting detectable beams onto predetermined points about said sensor, thereby to enable determination of said sensor's position.

Preferably, said sensor is operable to take an image of said projection units prior to a sub-image capture operation, therefrom to allow its position to be determined.

Preferably, said projection units are light emitting diodes.

Preferably, said integrator is operable to take a first sub-image and to insert onto blemished pixel positions thereof, image data from corresponding pixel positions of other sub-images.

Preferably, said integrator is operable to average together image data of respective non-blemished pixel positions of each sub-image.

Preferably, a distance between respective image capture positions is not a whole number of pixels, said integrator being operable to interpolate to produce corresponding pixel data.

Preferably, said image data is captured in a plurality of separate color channels and blemishes are generally restricted to a single color channel. In such a case, the integrator is operable at each blemish to use data from each complete color channel and surrounding data of each damaged color channel to interpolate for each damaged color channel.

According to a second aspect of the present invention there is provided a method of accommodating for blemished pixels in a pixellated image sensor comprising the steps of:

capturing a first sub image at a first sensor position, shifting said sensor, capturing a second sub-image at a second sensor position, and integrating data from corresponding pixels of said first sub-image and said second sub-image to form a complete image.

The method may additionally comprise:

testing said sensor to determine the positions of blemished pixels, and using said determined positions to calculate a shift for said sensor to minimize the number of blemish positions that superimpose with said sensor shift.

Preferably, said integrating comprises taking one sub-image and adding thereto data from another of said sub-images for each blemish position in said first sub-image.

Preferably, said integrating comprises averaging all available data from non-blemished pixel positions from each sub-image.

Preferably, if said shift is not a whole number of pixel positions then said integrating comprises using interpolation to provide pixel data at a non-integral position.

Preferably, color data is collected via separate color channels and wherein blemishes are per color such that at least one color channel is complete at a blemish position and at least one color channel is incomplete at said blemish position, the method comprising determining color data at said blemish position by interpolation using data of said complete channels at said blemish position together with data of said incomplete channels surrounding said blemish position.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
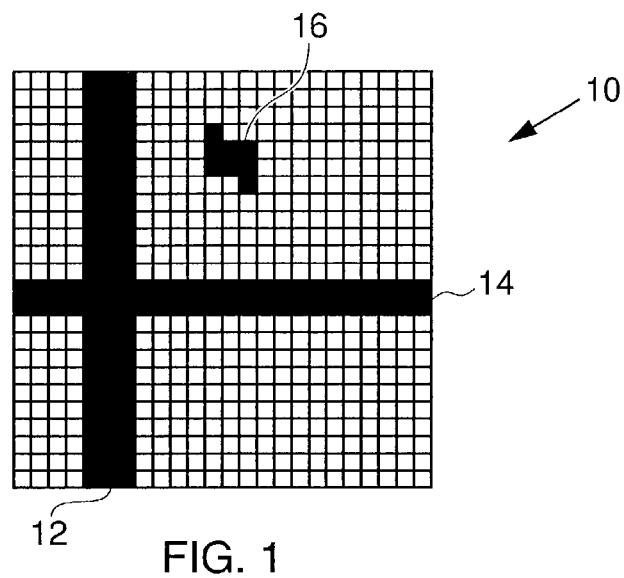
FIG. 1 is a simplified diagram showing a sensor with blemishes of the kind that cannot be compensated for using conventional means, which sensor is currently rejected for use.

The present embodiments disclose a method and apparatus for capturing images using a blemished full area sensor by taking at least two image captures and shifting the sensor between the image captures so that subsequent superimposing of the images leads to canceling of the blemishes.

More particularly, it is the purpose of the present embodiments to produce good quality images from sensors that have blemishes that currently lead to sensor rejection. More specifically it is desired to produce good quality images even in the cases of sensors having cluster blemishes larger than 2×2 and/or multi-column or multi-row blemishes of up to several rows and columns.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified diagram showing a large area sensor having blemishes thereon. Large area sensor 10 has blemishes 12, 14 and 16. Blemish 12 is a column blemish, blemish 14 is a row blemish and blemish 16 is a cluster blemish. In general, if sensor 10 is used to capture an image, then no reliable image data will be recorded at the blemished pixel positions.

Figure 2:
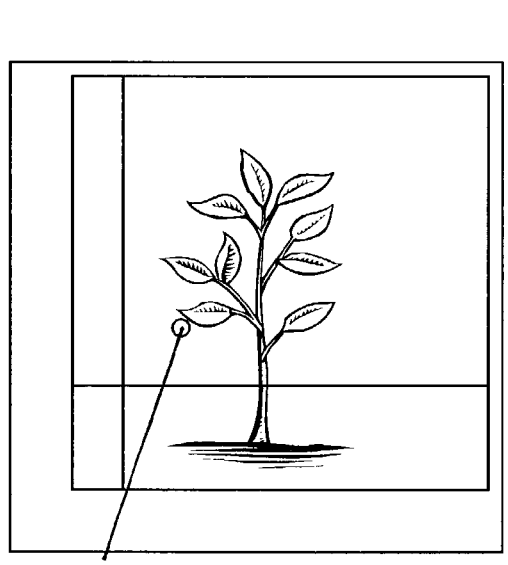
FIG. 2 is a simplified schematic illustration showing an image being taken with a sensor having blemishes of the kind shown in FIG. 1.

Reference is now made to FIG. 2, which shows an image to be captured, which is superimposed on sensor 10. In FIG. 2, black pixels 17 correspond to the blemish positions, and conventionally, no useful image data is recorded for the blemish pixel positions, substantially reducing the quality of the image.

Figure 3:
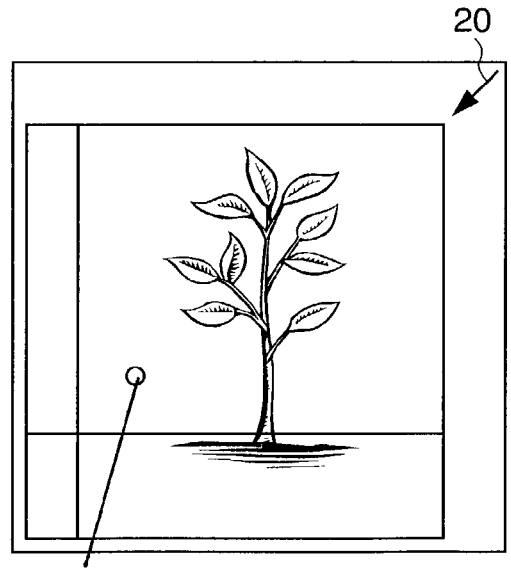
FIG. 3 is a simplified schematic illustration showing the image of FIG. 2 being taken by the sensor of FIG. 1, wherein the sensor of FIG. 1 has been shifted, from the image capture position of FIG. 2 to a new image capture position, thereby to compensate for the blemishes, in accordance with a first embodiment of the present invention.

Reference is now made to FIG. 3 which illustrates how compensation may be carried out for the blemished pixel positions in FIG. 2, according to a preferred embodiment of the present invention. In FIG. 3, the same image is captured by the same sensor 10 as shown in FIG. 2, however, the sensor has been shifted along the line of arrow 20 so that the image positions corresponding to blemished pixels in FIG. 2 no longer correspond to blemished pixels in FIG. 3, with the exception of two points of row column coincidence. As will be explained hereinbelow, it is possible to determine blemish positions and thus to calculate a suitable shift to minimize blemished pixel positions in the final image.

Figure 4:
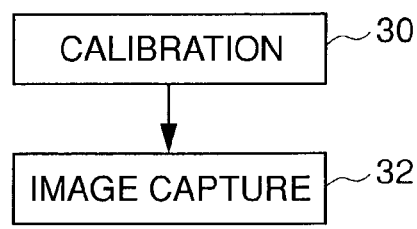
FIG. 4 is a simplified flow chart showing schematically a scheme for obtaining shifting to compensate for blemishes according to a preferred embodiment of the present invention.

Reference is now made to FIG. 4, which is a simplified flow chart showing two successive stages in realizing the shift of FIG. 3. A first stage 30 is a calibration stage, which calculates a suitable shift for the sensor and a second stage 32 is an image capture stage which uses the calculated shift in an image capturing process. The calibration stage is preferably carried out once only for the sensor, since the blemishes are generally manufacturing blemishes. The image capture stage is preferably carried out each time the sensor is used to capture an image.

Figure 5:
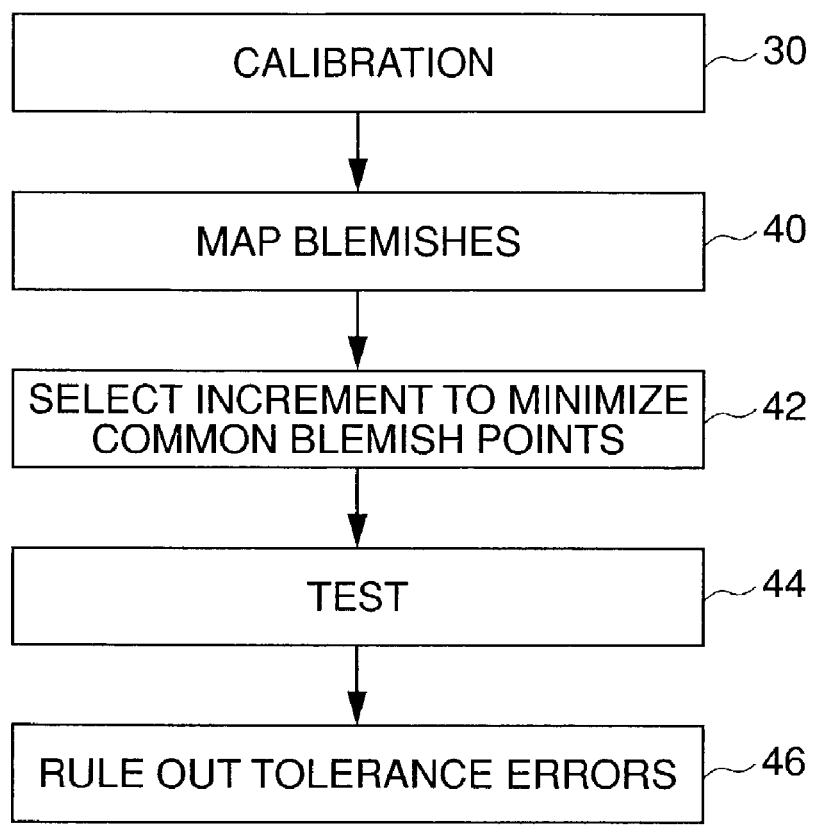
FIG. 5 is a simplified flow chart showing the calibration stage of FIG. 4.

Reference is now made to FIG. 5, which is a simplified flow chart that shows the calibration stage 30 in greater detail. In the calibration stage 30 the blemishes are firstly mapped, in a stage 40. Mapping may be by visual means. Alternatively mapping may be carried out by analysis of a test image made using the sensor on a uniformly illuminated area. On the basis of the mapping, in a stage 42, a first shift direction and a distance is selected with the property that no points in the scene fall under a blemish in two shots if the second shot is shifted relative to the first, with the exception mentioned above in respect of co-incident row and column blemishes where certain row points from one image map onto column points of the other image. Blemish superimposition of this kind is preferably dealt with by calculating a third shift. Generally two or three shift positions are sufficient but four or more shift positions are contemplated for heavy blemish situations.

The selection of shift distances and directions may be made, for example, by simple enumeration and testing, stage 44, of possible diagonal directions from 1 pixel down and 1 pixel across, up to say, 50 pixels down and 50 pixels across. Such a range gives a total of 50×50=2500 test possibilities. If each quadrant diagonal direction is tested then a total of 4×2500=10000 test possibilities is reached. It will be appreciated that more sophisticated search methods may also be employed. Preferably, a test criterion used for each selected distance and direction can also be used, stage 46, to rule out potential errors within the physical tolerance of the shifting arrangement. For example, if a distance of N pixels has been selected, no column blemishes should coincide over the same location in two shots, when the shots are shifted by a number between N−T and N+T pixels, T being a suitable threshold based on the known shift tolerance.

Figure 6:
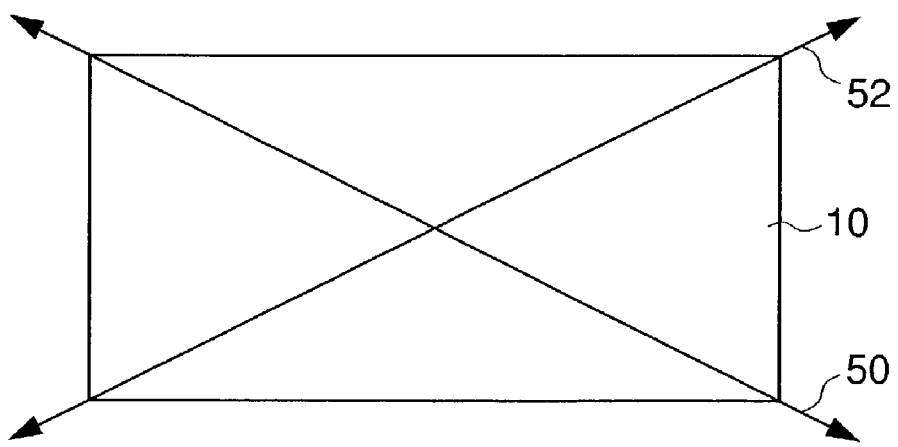
FIG. 6 is a simplified schematic diagram showing shifting axes of a sensor according to a preferred embodiment of the present invention.

In order for the calibration stage, and the subsequent shifting to be possible, it is necessary to provide actuation ability in order to provide rapid and accurate shifting of the sensor. It is also necessary to provide an ability to make an accurate position determination of the sensor. Reference is now made to FIG. 6 which is a simplified diagram showing sensor 10 with two axes of motion 50 and 52 defined along its diagonals. Preferably two actuators are provided to move the sensor along its diagonals in any desired combination. The use of diagonals is preferable since row and column blemishes are relatively common and diagonal motion is useful for dealing with combined row and column motion.

More particularly, the apparatus required for utilizing blemished sensors comprises actuation functionality for shifting the sensor 10 or the electronic board containing the sensor 10 a given distance in the back focal plane, in a diagonal direction. Preferably, the apparatus comprises two motors, each enabling the sensor or board to be moved in a different diagonal direction. As mentioned above, diagonals are preferred as this is the best way to deal with row and column blemishes. Extreme shift accuracy is not required, as mentioned above with respect to the physical tolerance of the shifting arrangement. The tolerance limit of the actuators need only be sufficient to ensure that, after the calibration stage described above, the shifted shot can be made not to place one blemish over another.

Figure 7:
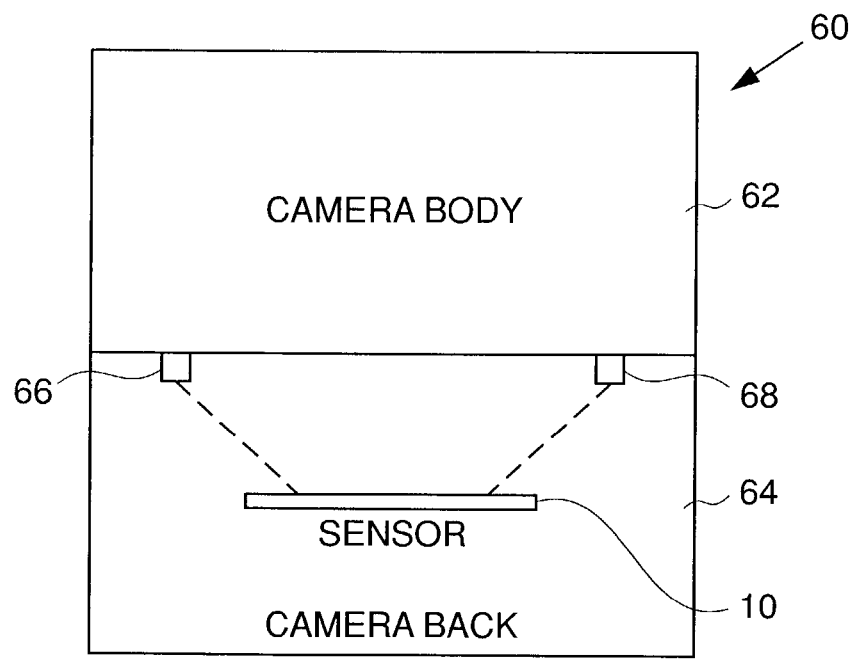
FIG. 7 is a simplified schematic view from above of a camera showing projection apparatus for registration between shifted images, in accordance with a preferred embodiment of the present invention.
Figure 8:
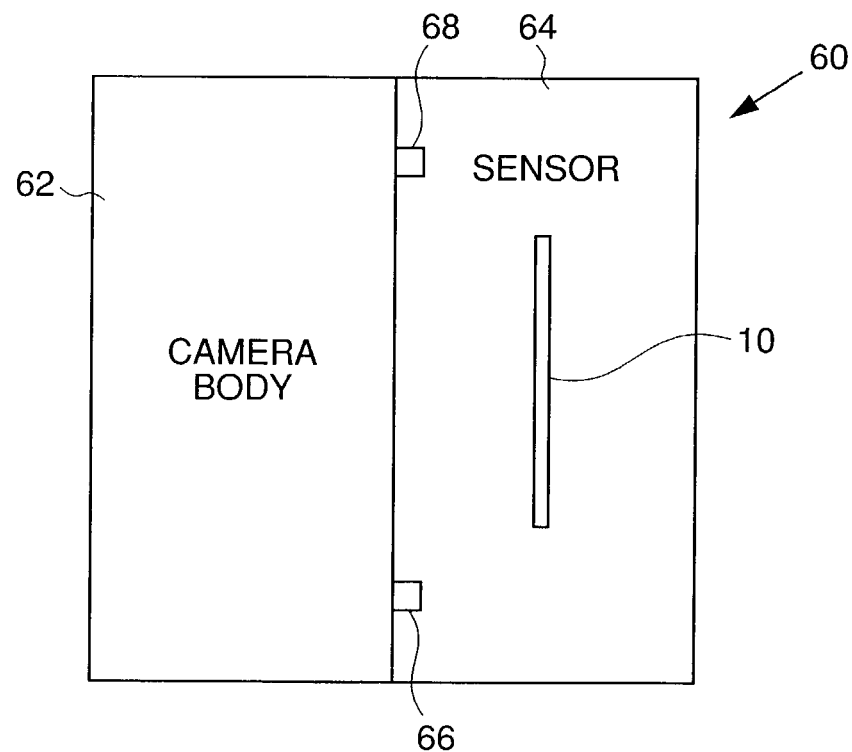
FIG. 8 is a simplified schematic view of the apparatus shown in FIG. 7 shown in side view.

Reference is now made to FIG. 7, which is a simplified block diagram showing a registration system for aligning the sensor 10 to ascertain what shifts have been applied so that the resulting images can be correctly integrated together. Sensor 10 is located within camera 60. Camera 60 has a camera body 62 and camera back 64, and sensor 10 is located in camera back 64. Two projection devices, preferably laser diodes 66 and 68, are located in the vicinity of the sensor 10 so as to project light on to two diagonally opposed corners of the sensor. FIG. 8 shows the same arrangement viewed from the side.

In use, the two projection devices 66 and 68, project an image such as a laser spot or a knife-edge beam on to the sensor in two locations, preferably the two diagonally opposed locations referred to above. The light is projected and a calibration image is captured just prior to the taking of each actual image. The calibration image faithfully records the relative displacement and rotation of the sensor between each image. Simple methods exist for computing the displacement and rotation on the basis of these calibration images. Methods are cited in Lisa Gottesfeld Brown, "A Survey of Image Registration Techniques", ACM Computing Surveys, 1992, the contents of which are hereby incorporated by reference. The images themselves may also be analyzed and used for computing the displacement and rotation.

Returning now to FIG. 4, and, in the second stage 32, the calibration results are used to shoot and process images. For each photograph or image captured, two or more shots are taken, where each shot is shifted relative to the first using the given distances and directions determined at the calibration stage.

Figure 9:
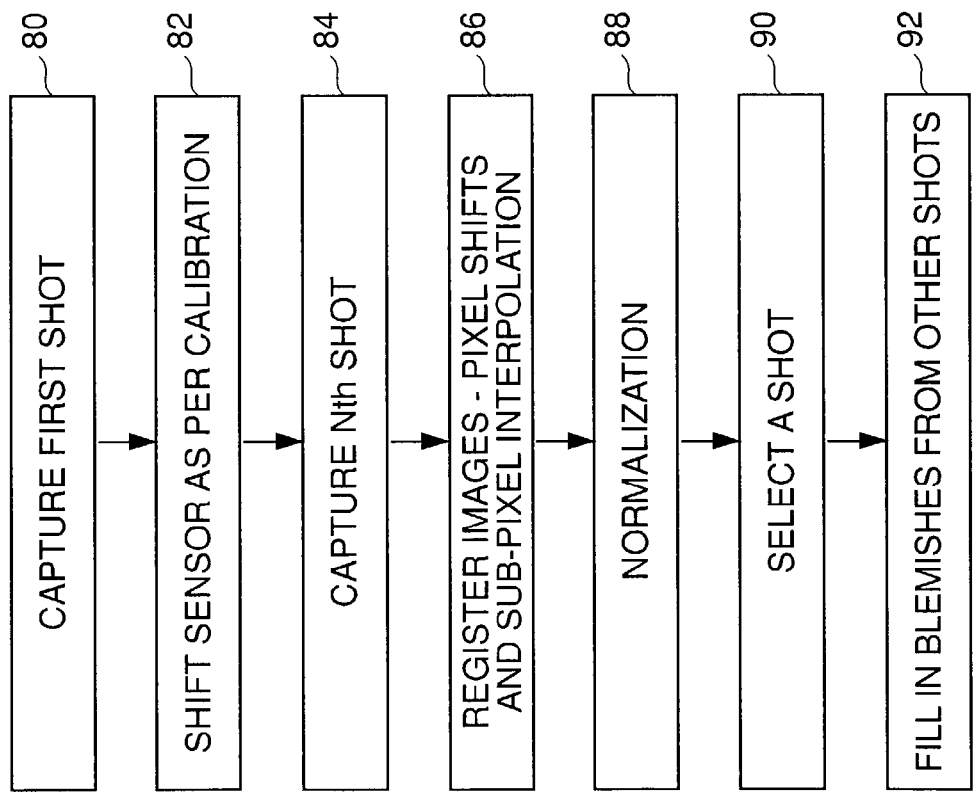
FIG. 9 is a simplified flow chart showing a first embodiment of the image capture procedure of FIG. 4.

Reference is now made to FIG. 9, which is a simplified flow chart of a first preferred embodiment of the image capture process. The number of shots needed for formation of each image, and the way the shots are processed are described hereinbelow.

In the following, the term "shot" is used to denote the taking of a single image once only at a single position of the sensor. The term "image capture" is used to describe the full process involving multiple shots at multiple sensor positions involved in obtaining a blemish compensated image. In the case of mosaic sensors such as those found in the Leaf Cantare XY, only one shot is required for each unblemished location in the image. For each scene point it is possible, using the calibrated shift described above, to ensure that there is at least one shot where any given point has not fallen on a blemish. It is easy to see that for cluster type blemishes, two shots are sufficient. However, if the sensor has both column and row blemishes, then for each row column junction there will generally be a point that forms part of the column in one shift position and part of the row in the other.

These co-incident points may only be properly sampled with a third shot using a different shift direction and distance.

A series of shots is taken at shifted sensor positions in stages 80, 82 and 84. Typically the number of shots is two, but if there are both row and column blemishes then the number is preferably three, as discussed above.

In a stage 86, the images are geometrically registered in order to be fused into a final blemishless image. Registration between two shots may be performed using any one of several different ways. A preferred way of obtaining displacements has already been described in respect of FIGS. 7 and 8 above. Based on the displacements thus or otherwise obtained, the images are registered, preferably using whole pixel shifts. In addition, where the shift is not a whole number of pixels, it is possible to use sub-pixel interpolation to provide precise data values. In a stage 88, the individual shots are further normalized to compensate for differences in light intensity between shots. A preferred normalization process involves multiplicatively normalizing all shots to have the same average value in each channel, where the averages are taken over all common scene pixels. For color image capture, the term "channel" refers to image capture per color.

As shown in FIG. 9, a final image capture is then composed by selecting, in step 90, a first registered, normalized shot as the main image and then, in step 92, substituting data samples from the other shots into locations that are blemished in the main image.

Figure 10:
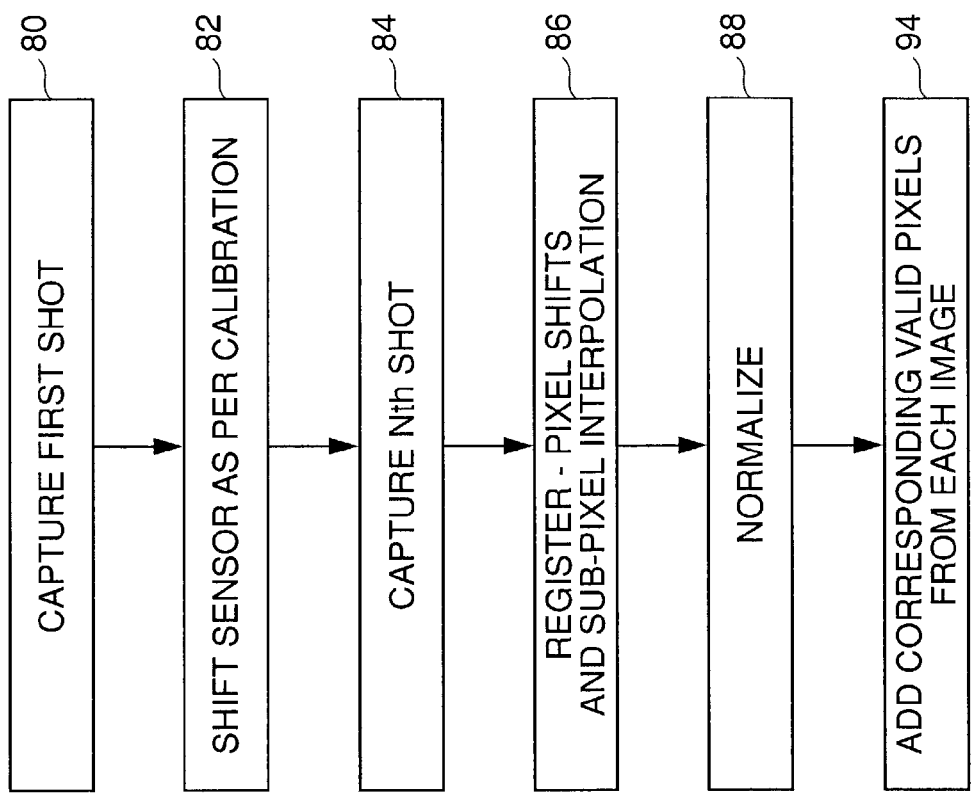
FIG. 10 is a simplified flow chart showing a second embodiment of the image capture procedure of FIG. 4.

Reference is now made to FIG. 10, which is a simplified flow chart showing an alternative method of image capture. Stages that are the same as in FIG. 9 are given the same reference numerals and are not discussed again except as necessary for an understanding of the present embodiment. Once all of the shots have been normalized in stage 88, a final image capture is formed by taking an average of all of the valid normalized pixel samples available for each final image pixel position.

In the case of backs such as the Leaf Volare, in which three shots are taken through different colored filters, three times as many shots are taken to form the final image, that is three instead of one for each shifted location. Thus a separate image is formed for each color at each sensor location.

Alternatively, it is possible to interpolate missing color channels on the basis of known color channels. Most, though not all, blemishes are single color blemishes. Thus, for three single color channel shots, most blemishes have two complete channels and one missing channel, so the missing channel may be interpolated using known surrounding values in the missing channel and full information in the other two channels. By contrast, the chances are that separate row and column blemishes are for different colors. Therefore, for row and column junction points from shifted shots, the chances are that there will be two missing channels out of three. Generally, however, such junction points are only small clusters, and this may be ensured by placing a limit on the number of adjacent blemished columns or rows that are permitted, before the sensor is rejected.

In a further preferred embodiment, it is possible to perform an additional, say a fourth, shot at a further diagonal shift of the sensor. At the fourth shot it is possible to add an extra channel with no filter. Alternatively, a fourth colored filter may be used, or a repeat shot may be taken of say, the green channel. In general, row/column junctions from two shots, as described above, have n−2 (n minus 2) samples where n is the total number of shots. Additional color channels may increase the information in blemished locations and decrease the chance of interpolation errors. A suitable interpolation method for missing data in a color channel is described in R. Kimmel, Demosaicing: Image reconstruction from color CCD samples. *IEEE Trans. on Image Processing*, 8(9):1221-8, Sep. 1999, the contents of which are hereby incorporated by reference.

A particular advantage of the preferred embodiments is that they make it possible to provide very large sensors for multi-shot cameras at a significantly increased effective yield, since they increase the tolerance to blemishes.

Whilst the above embodiments have concentrated on image capture via a camera, it will be appreciated that the principles of the invention apply equally to other devices in which image capture is made onto pixellated sensors liable to blemishes, including microscopes, telescopes, video cameras, infra-red, microwave and night-vision devices.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. Apparatus for image capture via a blemished sensor, comprising:
   an image sensor, said image sensor comprising pixels and being actuatable to move between at least a first image capture position and a second image capture position,
   an image capture controller for controlling said sensor to move between said image capture positions during an image capture operation thereby to take a sub-image at each one of said positions so that parts of an image subject are captured by at least two separate pixels of said sensor, and
   an integrator, associated with said sensor, for integrating said sub-images into a single full image,
   said sub image being captured in a plurality of separate color channels and blemishes being generally restricted to a single color channel, wherein said integrator is operable at each blemish to use data from each complete color channel and surrounding data of each damaged color channel to interpolate for each damaged color channel.

2. The apparatus of claim 1, wherein said sensor is actuatable about two separate axes.

3. The apparatus of claim 2, wherein said sensor is substantially quadrilateral and said two separate axes are respective diagonals of said sensor.

4. The apparatus of claim 1, further comprising a calibrator operable to calibrate said apparatus by determining said image detection positions such that a minimum of blemished pixels are superimposed over other blemished pixels for all of said image capture positions.

5. The apparatus of claim 4, wherein said calibrator is operable to carry out a blemish test on said sensor to determine positions of blemished pixels.

6. The apparatus of claim 5, wherein said blemish test comprises analysis of a test image of a uniformly illuminated area, captured by said sensor.

7. The apparatus of claim 1, further comprising a registration device for registering a position of said sensor.

8. The apparatus of claim 7, wherein said registration device comprises two projection units for projecting detectable beams onto predetermined points about said sensor, thereby to enable determination of said sensor's position.

9. The apparatus of claim 8, wherein said sensor is operable to take an image of said projection units prior to a sub-image capture operation, therefrom to allow its position to be determined.

10. The apparatus of claim 8, wherein said projection units are light emitting diodes.

11. The apparatus of claim 1, wherein said integrator is operable to take a first sub-image and to insert onto blemished pixel positions thereof, image data from corresponding pixel positions of other sub-images.

12. The apparatus of claim 1, wherein said integrator is operable to average together image data of respective non-blemished pixel positions of each sub-image.

13. The apparatus of claim 1, wherein a distance between respective image capture positions is not a whole number of pixels, said integrator being operable to interpolate to produce corresponding pixel data.

14. A method of accommodating for blemished pixels in a pixellated image sensor comprising the steps of:
    capturing a first sub image at a first sensor position,
    shifting said sensor,
    capturing a second sub-image at a second sensor position, and
    integrating data from corresponding pixels of said first sub-image and said second sub-image to form a complete image,
    wherein color data is collected via separate color channels and wherein blemishes are per color such that at least one color channel is complete at a blemish position and at least one color channel is incomplete at said blemish position, the method comprising determining color data at said blemish position by interpolation using data of said complete channels at said blemish position together with data of said incomplete channels surrounding said blemish position.

15. The method of claim 14, additionally comprising:
    testing said sensor to determine the positions of blemished pixels, and
    using said determined positions to calculate a shift for said sensor to minimize the number of blemish positions that superimpose with said sensor shift.

16. The method of claim 15, wherein said integrating comprises taking one sub-image and adding thereto data from another of said sub-images for each blemish position in said first sub-image.

17. The method of claim 15, wherein said integrating comprises averaging all available data from non-blemished pixel positions from each sub-image.

18. The method of claim 14, wherein, if said shift is not a whole number of pixel positions then said integrating comprises using interpolation to provide pixel data at a non-integral position.

* * * * *